(12) United States Patent
Kubota et al.

(10) Patent No.: US 10,714,936 B2
(45) Date of Patent: Jul. 14, 2020

(54) SYSTEM INTERCONNECTING FACILITY

(71) Applicants: Kabushiki Kaisha Toshiba, Minato-ku (JP); Toshiba Energy Systems & Solutions Corporation, Kawasaki-shi (JP)

(72) Inventors: Masayuki Kubota, Musashino (JP); Tsutomu Tanno, Fuchu (JP); Mami Mizutani, Hachioji (JP); Shinya Naoi, Kodaira (JP); Masako Kiuchi, Fuchu (JP); Midori Otsuki, Fuchu (JP); Kazuyoshi Shimada, Fuchu (JP)

(73) Assignees: Kabushiki Kaisha Toshiba, Minato-ku (JP); Toshiba Energy Systems & Solutions Corporation, Kawasaki-shi (JP)

( * ) Notice: Subject to any disclaimer, the term of this patent is extended or adjusted under 35 U.S.C. 154(b) by 187 days.

(21) Appl. No.: 16/079,884

(22) PCT Filed: Feb. 25, 2016

(86) PCT No.: PCT/JP2016/055581
§ 371 (c)(1),
(2) Date: Aug. 24, 2018

(87) PCT Pub. No.: WO2017/145316
PCT Pub. Date: Aug. 31, 2017

(65) Prior Publication Data
US 2019/0052079 A1    Feb. 14, 2019

(51) Int. Cl.
*H02J 3/01* (2006.01)
*H02J 3/38* (2006.01)
*G05B 19/042* (2006.01)

(52) U.S. Cl.
CPC .............. *H02J 3/01* (2013.01); *G05B 19/042* (2013.01); *H02J 3/38* (2013.01); *H02J 3/383* (2013.01); *G05B 2219/2639* (2013.01)

(58) Field of Classification Search
CPC ...... H02J 3/01; H02J 3/38; H02J 3/383; H02J 3/382; G05B 19/042; G05B 2219/2639
(Continued)

(56) References Cited

U.S. PATENT DOCUMENTS

| 5,383,107 A * | 1/1995 | Hopkins | H02M 1/12 |
| | | | 363/41 |
| 2007/0008076 A1 * | 1/2007 | Rodgers | H02J 3/14 |
| | | | 700/295 |

(Continued)

FOREIGN PATENT DOCUMENTS

| JP | 7-131937 A | 5/1995 |
| JP | 7-274398 A | 10/1995 |

(Continued)

OTHER PUBLICATIONS

International Search Report dated May 17, 2016 in PCT/JP2016/055581 filed Feb. 25, 2016.

*Primary Examiner* — Kenneth M Lo
*Assistant Examiner* — Mohammed Shafayet
(74) *Attorney, Agent, or Firm* — Oblon, McClelland, Maier & Neustadt, L.L.P.

(57) ABSTRACT

A system interconnecting facility is connected to a power system, and includes a plurality of power converters connected to the power system, a plurality of transformers provided between the power system and the power converters, a plurality of switches provided between the transformers and the power converters, and a controller that controls the opening and closing of the switch. The controller outputs, to the switches, open and close commands in so that the number of closed switches is out of a closed switch number (Continued)

range where a harmonic voltage of the system interconnecting facility increases, based on a harmonic voltage containing rate characteristic that is a relation between the number of closed switches and a harmonic voltage containing rate of the system interconnecting facility. The system interconnecting facility is capable of suppressing a harmonic voltage even if a circuit structure differs depending on a situation.

8 Claims, 7 Drawing Sheets

(58) Field of Classification Search
 USPC .......................................................... 700/295
 See application file for complete search history.

(56) References Cited

U.S. PATENT DOCUMENTS

| | | | | |
|---|---|---|---|---|
| 2007/0263336 | A1* | 11/2007 | Shudarek | H02M 1/126 361/118 |
| 2009/0176417 | A1* | 7/2009 | Rembach | B63H 21/20 440/6 |
| 2011/0133563 | A1* | 6/2011 | Barton | H02P 9/00 307/84 |
| 2011/0153236 | A1* | 6/2011 | Montreuil | G01R 19/2513 702/59 |
| 2012/0081061 | A1* | 4/2012 | Zargari | H02M 5/4585 318/503 |
| 2012/0306279 | A1* | 12/2012 | Garabandic | H02S 50/00 307/85 |
| 2013/0033907 | A1* | 2/2013 | Zhou | H02J 3/01 363/37 |
| 2013/0038123 | A1* | 2/2013 | Wilkins | H02J 13/0079 307/18 |
| 2013/0135907 | A1* | 5/2013 | Oi | H02M 7/797 363/40 |
| 2013/0181526 | A1* | 7/2013 | Iwasaki | H02J 1/10 307/43 |
| 2014/0132075 | A1* | 5/2014 | Fishman | H02J 3/38 307/82 |
| 2014/0266455 | A1* | 9/2014 | Kaatz | H03H 7/40 330/286 |
| 2015/0022140 | A1* | 1/2015 | Heishi | H02J 50/40 320/101 |
| 2015/0381089 | A1* | 12/2015 | Tarnowski | H02J 3/386 307/84 |
| 2017/0338690 | A1* | 11/2017 | Higashide | G01R 31/3835 |

FOREIGN PATENT DOCUMENTS

| | | |
|---|---|---|
| JP | 8-43459 A | 2/1996 |
| JP | 2000-333373 A | 11/2000 |
| JP | 2001-42957 A | 2/2001 |
| JP | 2008-219229 A | 9/2008 |
| JP | 2008-271709 A | 11/2008 |
| JP | 2009-219229 A | 9/2009 |
| JP | 2013-21856 A | 1/2013 |
| WO | WO 2012/050004 A1 | 4/2012 |

* cited by examiner

SYSTEM INTERCONNECTING FACILITY

FIELD

An embodiment of the present disclosure relates to a system interconnecting facility that suppresses a harmonic voltage.

BACKGROUND

In recent years, in order to introduce natural energy power generation, large scaling of distributed-type power supplies, such as solar light power generation facilities and wind power generation facilities, and battery systems for power fluctuation suppression or for peak shifting are advancing. Such distributed-type power supplies and battery systems are interconnected to a power system of, for example, an electricity power company via system interconnecting facilities.

System interconnecting facilities are facilities for electric power interchange between the distributed-type power supply and the battery system, and the power system, and include equipment, such as a transformer, a switch, and a power converter. The system interconnecting facilities interchanges power by mainly discharging power to the power system when connected to the distributed-type power supplies, and charges and discharges power between the power system when connected to the battery system.

CITATION LIST

Patent Literatures

Patent Document 1: JP 2009-219229 A

SUMMARY

When the system interconnecting facilities are connected to the systems, such as the distributed-type power supply and the battery system, for electric power interchange, a harmonic voltage may be generated within the system interconnecting facilities. Conventionally, to eliminate or reduce the generated harmonic wave, a filter, a capacitor with a reactor, etc., are installed, consuming a large amount of costs.

Although such a measure can suppress a harmonic wave in particular circuit structures, when the measure is permanent, and for example, when the open and close statuses of the switch, etc., in the system interconnecting facilities change depending on the situation, the impedance characteristics of the system interconnecting facilities changes depending on the situation, and the filter, the capacitor with a reactor, etc., installed for the particular circuit structures are not capable of fully suppressing the harmonic wave.

Moreover, when the impedance characteristics of the system interconnecting facilities change depending on the status of the switch, etc., installing the filter and the capacitor with the reactor to make a harmonic voltage not to be generated across the entire region of the system interconnecting facilities is difficult in view of the costs and the equipment installation space.

A system interconnecting facility according to an embodiment has been made to address the above technical problems, and an objective of the present disclosure is to provide a system interconnecting facility that can suppress a harmonic voltage even if a circuit structure differs depending on a situation.

In order to achieve the above objective, a system interconnecting facility according to an embodiment is a system interconnecting facility that is connected to a power system, and the system interconnecting facility includes:
a plurality of power converters connected to the power system;
a plurality of transformers provided between the power system and the power converters;
a plurality of switches provided between the transformers and the power converters; and
a controller that controls opening and closing of the switch,
in which the controller outputs, to the switches, open and close commands so that a number of closed switches is out of a closed switch number range where a harmonic voltage of the system interconnecting facility increases, based on a harmonic voltage containing rate characteristic that is a relation between the number of closed switches and a harmonic voltage containing rate of the system interconnecting facility.

DETAILED DESCRIPTION

1. First Embodiment

1-1. Structure

Figure 1:
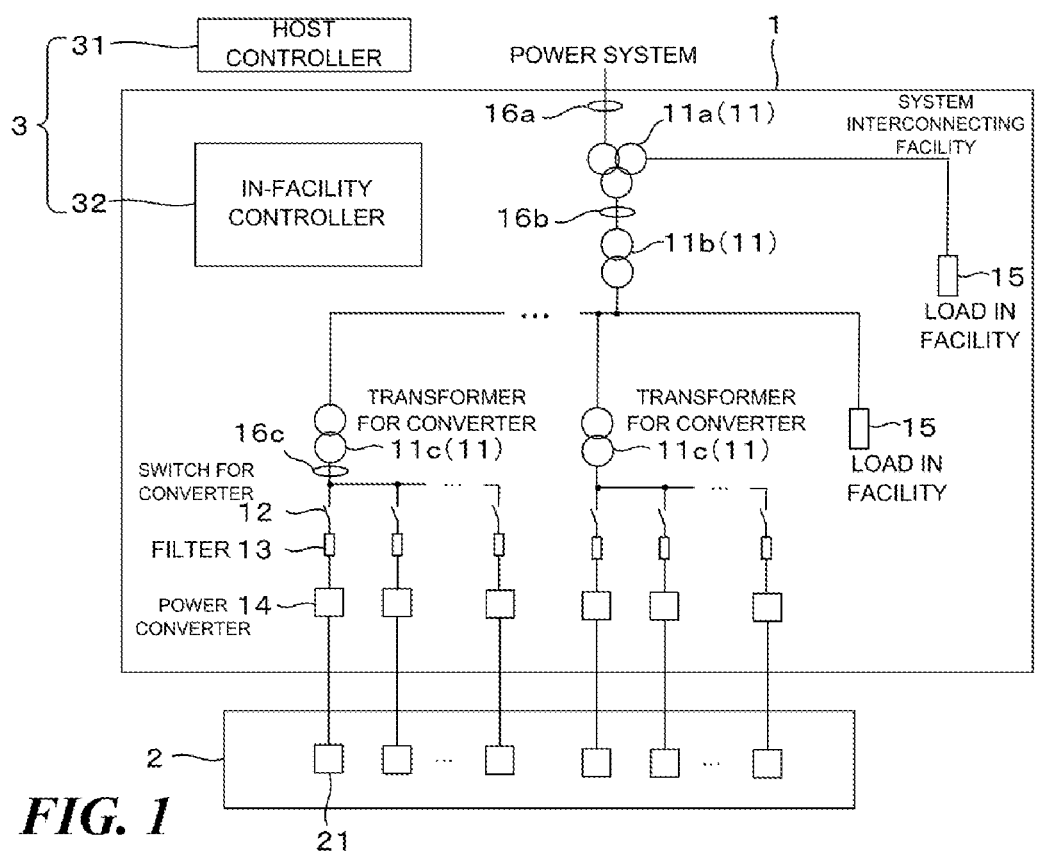
FIG. 1 is a diagram illustrating the entire system to which a system interconnecting facility according to a first embodiment is applied.

In below, a system interconnecting facility according to this embodiment will be described with the reference to FIG. 1 to FIG. 3. FIG. 1 is a diagram illustrating the entire system to which the system interconnecting facility according to this embodiment is applied.

As shown in FIG. 1, a system interconnecting facility is connected to a power system of, for example, an electricity power company, and a battery system 2 that includes a plurality of storage batteries 21, and interchanges a power. In this embodiment, since the system interconnecting facility 1 is connected to the battery system 2, the system interconnecting facility executes any of charging and discharging, charging, and, discharging relative to the power system. The system interconnecting facility 1 may be connected to, instead of the battery system 2, a distributed-type power supply, such as a solar light power generation facilities or wind power generation facilities. In this case, the system interconnecting facility mainly executes discharging to the power system.

The system interconnecting facility 1 includes a plurality of transformers 11, a plurality of switches 12, a plurality of filters 13, a plurality of power converters 14 (also simply referred to as a "converter" below), and a plurality of loads 15. As for a configuration of the system interconnecting facility 1, for example, each device 11 to 15 are installed in the same building, or in a plurality of buildings and a plurality of containers, and are connected via a communication line and a power line.

The transformer 11 changes the voltage to provide the power to each device within the system interconnecting facility 1. The transformer 11 includes transformers 11a and 11b that output the converted voltage to the load 15, and transformers 11c for the converters 14. The transformer 11a is provided at a higher side, that is, the power system side, and the transformer 11b is provided at the lower side of the transformer 11a, that is, the battery-system-2 side. Moreover, the transformers 11c for the plurality of converters are connected in parallel with the load 15 at the lower side of the transformer 11b, and the transformers 11c for the converters 14 is connected to a circuit in parallel, in which the circuit includes the switch 12, the filter 13, and the converter 14 connected in series. Hence, the system interconnecting facility 1 has multiple sets of the switches 12 and the converters 14 connected in series.

The switch 12 connects and disconnects the converter 14. The filter 13 is an equipment that eliminates or reduces a harmonic voltage generated in the system interconnecting facility 1, and is, for example, formed by L, R, C. The converter 14 converts AC and DC, includes switching elements, and is connected to the power system and the battery 21 via the transformer 11 and the switch 12.

The system interconnecting facility 1 is provided with a plurality of voltage sensors 16a to 16c to measure a voltage. The voltage sensors 16a to 16c measure a fundamental wave voltage and an odd-order harmonic voltage. In this example, the voltage sensor 16a is provided between the power system and the transformer 11a, and the voltage sensor 16b is provided between the transformers 11a and 11b. Moreover, the voltage sensor 16c is provided between the transformer 11c and the switch 12.

Furthermore, the system interconnecting facility 1 includes a controller 3. The controller 3 is connected to each device within the system interconnecting facility 1 via wired or wireless communication lines, collects the information of each device and controls each device. The device to be controlled includes the switch 12, the converter 14, and the load 15.

The controller 3 includes a single computer or a plurality of computers connected over a network, and a display. The controller 3 stores a program and a database in an HDD or an SSD, etc., develops them in a RAM as appropriate, and processes them by a CPU, to execute an arithmetic processing to be described later and display information on a display device.

The controller 3 includes a host controller 31 provided at a central power supplying control station, etc., and an in-facility controller 32 provided in the system interconnecting facility 1. The host controller 31 and the in-facility controller 32 are connected via wired or wireless communication lines, and transmit and receive information. In this embodiment, the controller 3 is divided into the host controller 31 and the in-facility controller 32, but it is not always necessary to divide the controller. Moreover, it is not always necessary to provide the in-facility controller 32 in the system interconnecting facility 1. The host controller 31 and the in-facility controller 32 are also simply referred to as the "controllers" 31 and 32.

Figure 2:
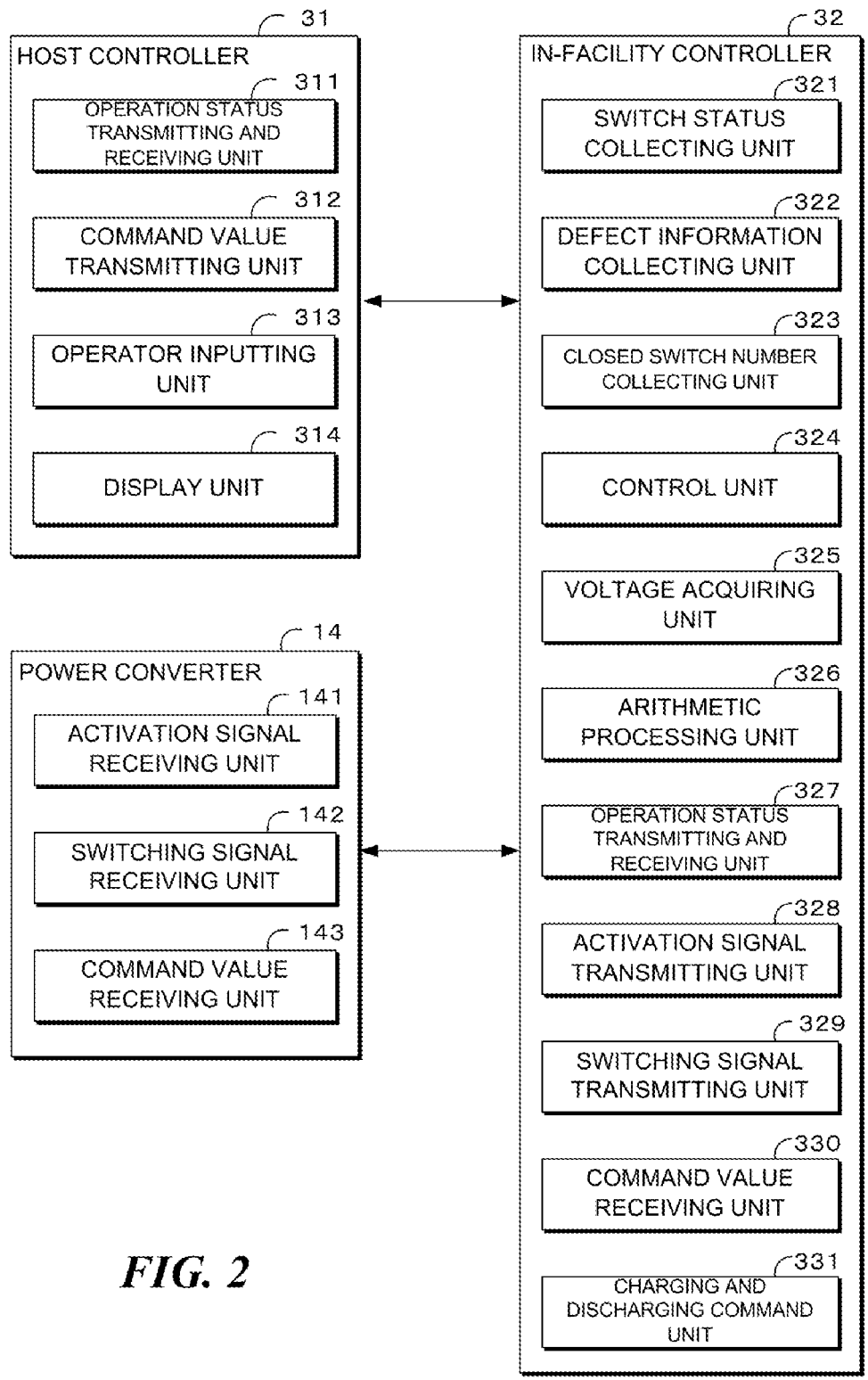
FIG. 2 is a functional block diagram for a controller and for a power converter according to the first embodiment.

FIG. 2 is a functional block diagram for the controller 3 and for the converter 14 according to this embodiment. As shown in FIG. 2, the controller 32 includes a switch status collecting unit 321, a defect information collecting unit 322, a closed switch number collecting unit 323, a control unit 324, a voltage acquiring unit 325, an arithmetic processing unit 326, an operation status transmitting and receiving unit 327, an activation signal transmitting unit 328, a switching signal transmitting unit 329, a command value receiving unit 330, and a charging and discharging command unit 331.

The switch status collecting unit 321 collects the open and close status of each switch 12. The defect information collecting unit 322 collects the defect status of each of the devices 11 to 15. The closed switch number collecting unit 323 collects the number of closed switches 12 from the open and close status information of the switches acquired by the switch status collecting unit 321. Moreover, when collecting the number of closed switches, the closed switch number collecting unit 323 may execute collection while considering the defect of the switches 12 from the defect information collecting unit 322.

The control unit 324 controls the opening and closing of the switch 12. More specifically, based on a harmonic voltage containing rate characteristic that is a relation between the number of closed switches 12 and the harmonic voltage containing rate of the system interconnecting facility 1, the control unit 324 outputs open and close commands to the switches 12 so that the number of closed switches 12 becomes out of a closed switch number range (hereinafter, simply referred to as "avoided number range") that is the range which increases the harmonic voltage of the system interconnecting facility 1.

The harmonic voltage containing rate indicates a rate of the harmonic voltage relative to a fundamental wave voltage. The harmonic voltage means odd-order harmonic voltages, such as a tertiary, a quinary, and a septenary. As for an example of the harmonic voltage containing rate characteristic, FIG. 3 illustrates the harmonic voltage containing rate characteristic with the number of closed switches 12 being a horizontal axis, and a septenary harmonic voltage containing rate being a vertical axis.

The harmonic voltage containing rate characteristic may be stored in advance in a storage unit (unillustrated) provided to the controller 3, or may be acquired by external input from the host controller 31, etc. Moreover, such a characteristic may be acquired from actual measurements. The following description will be given of an example case in which such a characteristic is acquired by actual measurements.

The control by the control unit 324 to cause the number of closed switches out of the avoided number range will be described in detail. For example, in order to cause the number of closed switches 12 to be out of the avoided number range, the avoided number range is set in advance to be the number of closed switches 12 that causes the harmonic voltage containing rate to exceed a predetermined threshold (e.g., 3%), and the control unit 324 outputs, to the switches 12, the open and close commands that cause the number of closed switches to be the number out of the avoided number range, that is, the number within the closed switch number range for the switches 12 which causes the harmonic voltage containing rate to be equal to or smaller than a predetermined threshold. Under this control of causing the number of closed switches to be out of the avoided number range, when such a number is outside the avoided number range, the number of closed switches 12 and which switch 12 is to be closed are arbitrary, and can be designed and changed as appropriate. For example, a decision may be made by the control unit 324, or a setting by an operator may be entered via an operator inputting unit 313 to be described later.

Moreover, as for the control to cause the number of closed switches to be out of the avoided number range, when the control unit 324 determines that the present number of closed switches collected by the closed switch number collecting unit 323 is within the avoided number range, the control unit 324 may select and decide the number of closed switches that is out of the avoided number range and the switch 12 to be closed, or may display an alert indicating that the present number of closed switches is within the avoided number range on a display unit 314 to be described later and may receive an input of the number of the closed switches that is out of the avoided number range by the operator via the operator inputting unit 313 to be described later.

The voltage acquiring unit 325 acquires the voltage that contains the fundamental wave voltage and the odd-order harmonic voltage that are measured by the voltage sensors 16a to 16c. The arithmetic processing unit 326 calculates the harmonic voltage containing rate from the fundamental wave voltage and the odd-order harmonic voltage acquired by the voltage acquiring unit 325, and obtains the harmonic voltage containing rate characteristic. The arithmetic processing unit 326 may store in advance the circuit structure of the system interconnecting facility 1 in a storage unit (unillustrated) provided in the controller 32, and may execute a simulation from the circuit structure to acquire the harmonic voltage containing rate characteristic.

The operation status transmitting and receiving unit 327 transmits all or part of data received by the controller 32 to the host controller 31, and transmits and receives a protection value and information of the converter 14 to be activated, etc., transmitted from the host controller 31.

The activation signal transmitting unit 328 outputs an activation signal to the converter 14. The switching signal transmitting unit 329 transmits a switching signal to the converter 14. The switching signal is a signal to be given to the switching elements of the converter 14, and the converter 14 executes switching by the signal. The command value receiving unit 330 receives a charging and discharging command value transmitted from the host controller 31. Example charging and discharging command values are the command value of effective power and the command value of reactive power. The charging and discharging command unit 331 outputs the received charging and discharging command value to the converter 14. When the charging and discharging command value is not transmitted from the host controller 31, the charging and discharging command unit 331 may create the charging and discharging command value, and may output the command value to the converter 14.

The controller 31 includes an operation status transmitting and receiving unit 311, a command value transmitting unit 312, the operator inputting unit 313, and the display unit 314.

The operation status transmitting and receiving unit 311 receives all or part of data owned by the controller 32 from the controller 32, and transmits the protection value and the information of the converter 14 to be activated, etc., to the controller 32. The command value transmitting unit 312 transmits the charging and discharging command value for the converter 14 to the command value receiving unit 328. The operator inputting unit 313 is user interfaces, such as a mouse, a keyboard, and a touch panel. For example, the charging and discharging command value and the number of closed switches 12, etc., input by the operator is entered. The display unit 314 displays the open and close status of the switch 12, and the operation status of each device, etc. Moreover, the display unit 314 displays the alert when the number of closed switches 12 input via the operator inputting unit 313 is within the range where the harmonic voltage containing rate is large.

As illustrated in FIG. 2, the converter 14 includes an activation signal receiving unit 141, a switching signal receiving unit 142, and a command value receiving unit 143. The activation signal receiving unit 141 receives the activation signal from the activation signal transmitting unit 328. The switching signal receiving unit 142 receives the switching signal from the switching signal transmitting unit 329. The command value receiving unit 143 receives the charging and discharging command value from the charging and discharging command unit 331. The converter 14 converts the AC and the DC in accordance with the charging and discharging command value.

1-2. Action

An action of the system interconnecting facility 1 according to this embodiment will be described with reference to FIG. 3. Although the septenary harmonic voltage will be described as an example of the odd-order harmonic voltage, it may be tertiary, quinary, nonary, undenary, or tredenary. In this case, the number of the switches 12 and that of the converters 14 are each 100.

First, the harmonic voltage containing rate characteristic will be described. The harmonic voltage containing rate characteristic changes depending on the circuit structure of the system interconnecting facility 1. For example, although it is expected that the switch 12 is located between the transformer 11c and the converter 14 in FIG. 1, said characteristic also changes depending on the statuses of the switches installed at other locations. Moreover, said characteristic also changes depending on the transformer 11 and the power distribution line in the system interconnecting facility 1, and the filter constant of the filter 13.

Figure 3:
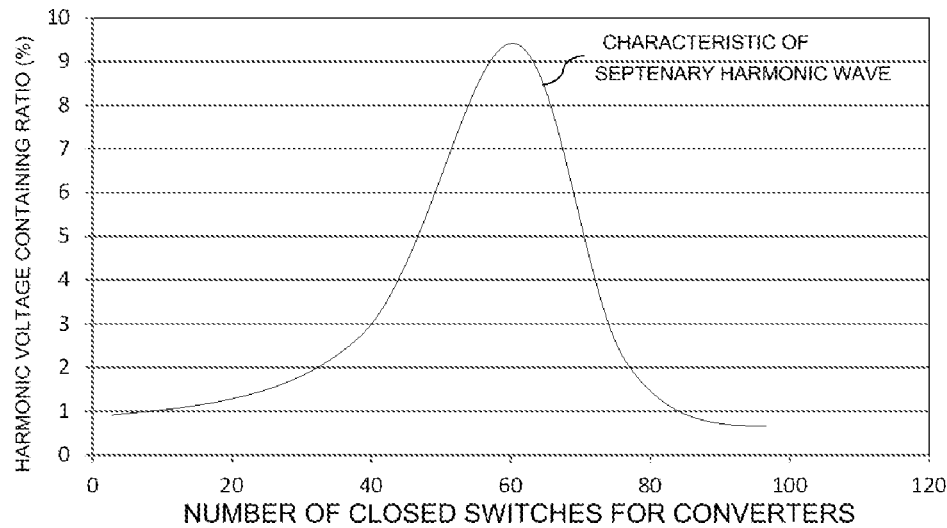
FIG. 3 is a diagram illustrating a harmonic voltage containing rate characteristic.

As illustrated in FIG. 3, the harmonic voltage containing rate is a graph in a mountain shape, and has the peak at the number of closed switches 12 that is 60. That is, since the harmonic voltage containing rate is high around 60, it is necessary to avoid the number of closed switches that is around 60. When a harmonic wave with a high harmonic voltage containing rate is generated, a harmonic current flows into the capacitor within the system interconnecting facility 1, and may cause a deterioration and a fire, and may cause an abnormal operation due to a false operation and a false detection depending on the converter 14.

In this embodiment, the control unit 324 outputs, to the switches 12, the open and close commands so that the number of closed switches 12 is out of the closed switch number range in which the harmonic voltage of the system interconnecting facility 1 increases. The closed switch number range is a range that the harmonic voltage containing rate becomes equal to or smaller than the predetermined threshold.

In this example, the threshold is set to be 3%, and the control unit 324 controls the opening and closing of the switches 12 so that the number of closed switches 12 becomes equal to or smaller than 40 or equal to or greater than 75. Which switch 12 is to be closed can be designed and changed as appropriate as long as such a range is achieved. As for the information which switch 12 is to be closed, for example, the number of closed switches decided by the operator is entered via the operator inputting unit 313, and is transmitted to the controller 32 from the controller 31 via the operation status transmitting and receiving unit 311. When the operator inputs the number of closed switches 12 that is equal to or greater than 41 and equal to or smaller than 74, the alert is displayed on the display unit 314, and the operator is urged to again set the number of closed switches. In this case, a stop signal may be simultaneously transmitted to the other converters 14 connected to the respective switches 12 not to be closed so that the number of closed switches 12 becomes equal to or smaller than 40.

At the time of activation sequence, the close signal for the switch 12 is simultaneously transmitted from the controller 32 at a signal contact, etc., having little communication delay, and the switches 12 subjected to the control are simultaneously activated to suppress an occurrence of the activation sequence delay within, for example, 10 ms. Such a signal transmission, etc., in the sequence is also effective in a de-activation sequence.

1-3. Effect (1) The system interconnecting facility 1 according to this embodiment is a system interconnecting facility which is connected to a power system, and which includes the plurality of power converters 14 connected to the power system, the plurality of transformers 11 provided between the power system and the power converters 14, the plurality of switches 12 provided between the transformers 11 and the power converters 14, and the controller 3 that controls the opening and closing of the switch 12. The controller 3 outputs, to the switches 12, open and close commands so that the number of closed switches 12 is out of the closed switch number range which the harmonic voltage of the system interconnecting facility 1 increases based on the harmonic voltage containing rate characteristic that is a relation between the number of closed switches 12 and the harmonic voltage containing rate of the system interconnecting facility 1.

Accordingly, the system interconnecting facility capable of suppressing a harmonic voltage is achieved even when a circuit structure differs depending on a situation.

(2) The controller 3 outputs, to the switches 12, the open and close commands that achieve the number of closed switches 12 which causes the harmonic voltage containing rate to be equal to or smaller than the predetermined threshold. This suppresses a harmonic voltage without a large amount of costs and an installation of equipment.

(3) The controller 3 includes the switch status collecting unit 321 that collects the open and close status information on each switch 12, the closed switch number collecting unit 323 that collects the number of closed switches from the open and close status information, the voltage acquiring unit 325 that acquires the measured voltage from the voltage sensors 16a to 16c which measure the voltage containing the fundamental wave voltage and the odd-order harmonic voltage, and the arithmetic processing unit 326 which calculates the harmonic voltage containing rate from the acquired fundamental wave voltage and odd-order harmonic voltage, and acquires the harmonic voltage containing rate characteristic from the number of closed switches and the acquired harmonic voltage containing ratio.

Thus, the harmonic voltage containing rate characteristic can be acquired by actual measurements even when there is changes such as additional installment of equipment in the system interconnecting facility, and an occurrence of the harmonic voltage can be flexibly suppressed.

2. Second Embodiment

2-1. Structure

A second embodiment will be described with reference to FIG. 4. The second embodiment employs the same basic structure as that of the first embodiment. In the following description, only a difference from the first embodiment will be described, the same reference numeral will be given to the same component as that of the first embodiment, and the detailed description thereof will be omitted.

The arithmetic processing unit 326 of the second embodiment acquires the harmonic voltage containing rate characteristic when the harmonic voltage containing rate has a fluctuation. The presence or absence of the fluctuation can be determined by, for example, calculating the harmonic voltage containing rate by the arithmetic processing unit 326 at a predetermined time cycle, and obtaining a difference. In this embodiment, the arithmetic processing unit 326 calculates the harmonic voltage containing rate from the actual measurements by the voltage sensors 16a to 16c, and obtains the harmonic voltage containing rate characteristic when the harmonic voltage containing rate decreases. That is, the characteristic is updated with a decrease in the containing rat being a trigger.

In the second embodiment, it is assumed that the number of closed switches 12 is adjusted by using the harmonic voltage containing rate characteristic based on the voltage sensor 16c where the highest harmonic wave is generated. The harmonic voltage containing rate characteristic may be updated and the number of closed switches may be changed based on only the actual measurements of this voltage sensor 16c, or the harmonic voltage containing ratio characteristic may be acquired and updated based on the voltage sensor 16c in accordance with a decrease in harmonic voltage containing ratio based on the voltage sensor 16a closest to the power system, and the number of closed switches may be changed. The number of closed switches may be changed by updating the harmonic voltage containing rate characteristic based on only the actual measurements of this voltage sensor 16c, or may be changed by updating the harmonic voltage containing rate characteristic based on the voltage sensor 16c in accordance with a decrease in harmonic voltage containing ratio based on the voltage sensor 16a that is the closest to the power system. The following description will be given of the latter case as an example.

More specifically, the arithmetic processing unit 326 calculates the harmonic voltage containing rate based on the voltage sensor 16a that is the closest to the power system, calculates the harmonic voltage containing rate based on the voltage sensor 16c where the highest harmonic wave is generated when there is a decrease, and acquires the harmonic voltage containing rate characteristic. That is, the harmonic voltage containing rate characteristic at the location closest to the power system changes, the arithmetic processing unit 326 acquires the harmonic voltage containing rate characteristic at the location where the highest harmonic wave is generated along with the changes.

The control unit 324 changes the avoided number range of the switches 12 based on the updated harmonic voltage containing rate characteristic. That is, the control unit 324 changes the avoided number range of the switches 12 based on the acquired harmonic voltage containing rate characteristic at the location where the highest harmonic wave is generated.

2-2. Action and Effect

In this embodiment, the arithmetic processing unit 326 acquires the harmonic voltage containing rate characteristic when the harmonic voltage containing decreases, and the controller 3 changes the avoided number range based on the harmonic voltage containing rate characteristic acquired when the harmonic voltage containing rate decreases.

This enables a proper management on the closed switch number range of the switches 12 that changes in accordance with a time, a place, the load information, and an event, etc. That is, a fluctuation in the voltage condition within the system interconnecting facility 1 occurs depending on a time or an event, and a fluctuation in the harmonic voltage containing rate characteristic occurs in accordance with the voltage condition fluctuation. Moreover, the harmonic voltage containing rate is low at the side near to the power system, and the harmonic voltage containing rate tends to increase due to distortion that increases as it goes towards the lower side. When, for example, the harmonic voltage containing rate based on the voltage at the voltage sensor 16a closest to the power system decreases, the graph of the harmonic voltage containing rate based on the voltage sensor 16c with the highest measured voltage also decreases.

Figure 4:
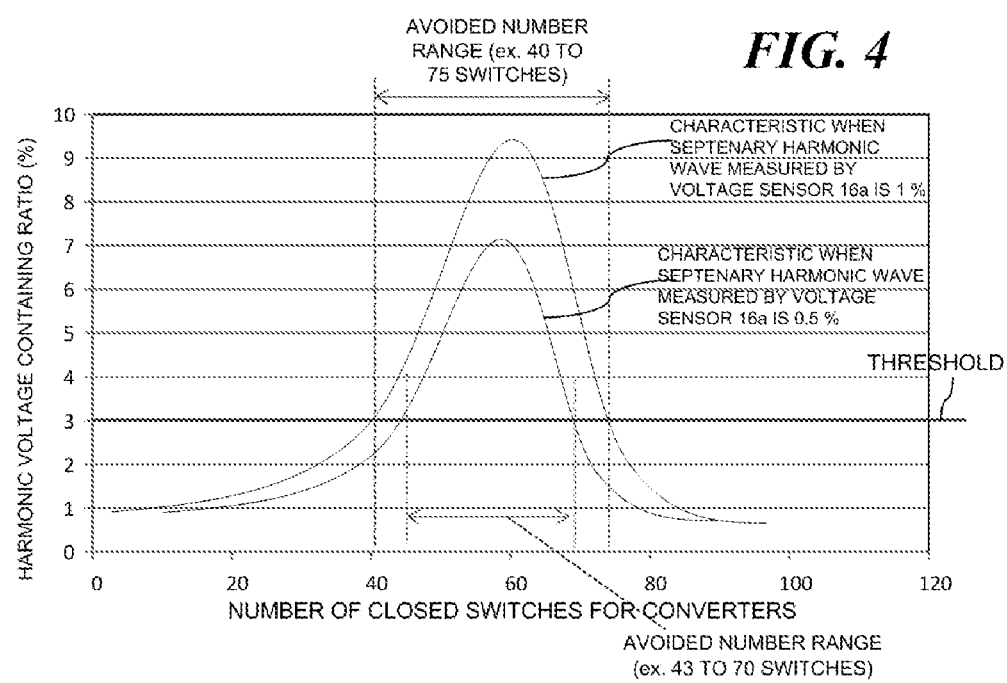
FIG. 4 is a diagram for explaining the harmonic voltage containing rate characteristic when the voltage condition in the system interconnecting facility changes.

Hence, as illustrated in FIG. 4, when the harmonic voltage containing rate based on the voltage sensor 16a closest to the power system decreases from 1% to 0.5%, since the harmonic voltage containing rate based on the voltage sensor 16c with the highest measured voltage also decreases, the closed switch number range where the harmonic voltage increases becomes narrow even at the same threshold. In the example illustrated in FIG. 4, when the harmonic voltage containing rate based on the voltage sensor 16a is 1%, the avoided number range is equal to or greater than 40 and equal to or smaller than 75, but when the harmonic voltage containing rate decreases to 0.5%, the avoided number range becomes equal to or greater than 43 and equal to or smaller than 70, and the avoided number range becomes narrow. Accordingly, it is not necessary to unnecessarily limit the number of operated converters. Hence, the unnecessary limitation during the operation can be avoided.

3. Third Embodiment

A third embodiment will be described with reference to FIG. 5 and FIG. 6. The third embodiment employs the same basic structure as that of the first embodiment. Only the difference from the first embodiment will be described below, the same reference numeral will be given to the same component as that of the first embodiment, and the detailed description thereof will be omitted.

Figure 5:
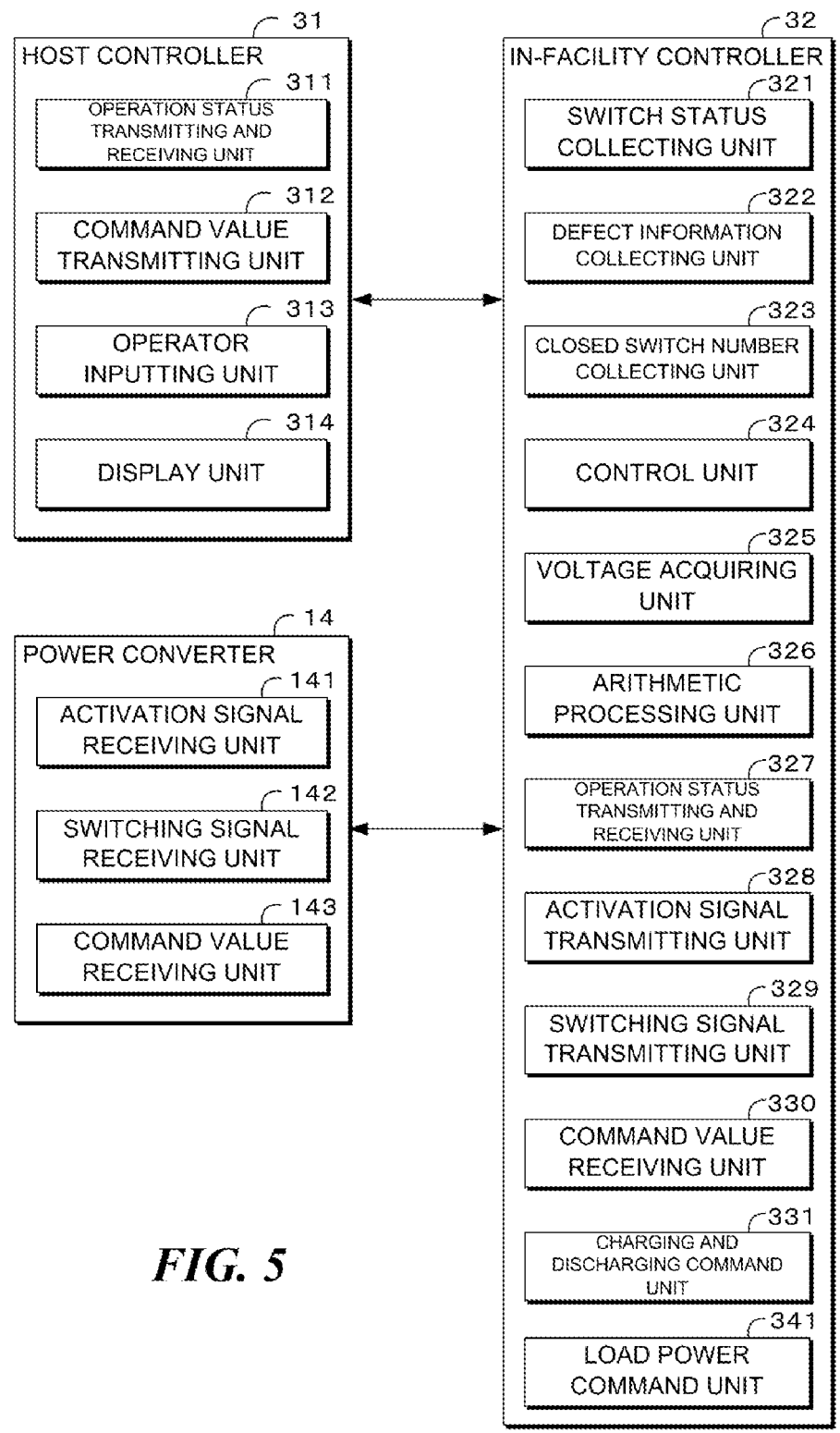
FIG. 5 is a functional block diagram for a controller and for a power converter according to a third embodiment.

FIG. 5 is a functional block diagram for the controller 3 and for the converter 14 according to the third embodiment. The controller 3 according to the third embodiment includes a load power command unit 341. The load power command unit 341 outputs a command to cause the load 15 to consume power.

Figure 6:
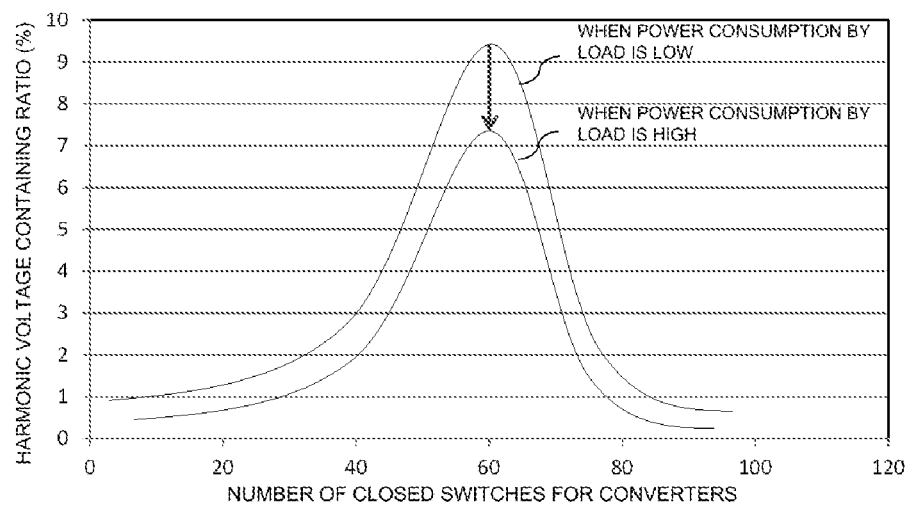
FIG. 6 is a diagram for explaining the harmonic voltage containing rate characteristic when load power consumption changes.

As illustrated in FIG. 6, within the system interconnecting facility 1, when a load power consumption is large, the harmonic voltage in the facility 1 tends to decrease in comparison with a case in which the load power consumption is small. In other words, as for the harmonic voltage that is generated in the system interconnecting facility 1, since the larger the current which flows through a resistance load is, the more the containing rate decreases, the harmonic voltage in the facility 1 can be reduced by the load power command unit 331 that outputs the command to activate the loads 15, such as a heater and an inverter.

This power consumption command may be output when the number of closed switches 12 is within the closed switch number range that causes the harmonic voltage containing rate to exceed a predetermined threshold. Moreover, it is effective when such a command is output when the harmonic voltage containing rate increases, such as when a maintenance for the device within the system interconnecting facility 1 is carried out.

4. Fourth Embodiment

A fourth embodiment employs the same basic structure as that of the first embodiment. Only the difference from the first embodiment will be described below, the same reference numeral will be given to the same component as that of the first embodiment, and the detailed description thereof will be omitted.

The fourth embodiment relates to a control aspect for the switches 12 and for the converters 14 by the controller 32. That is, the system interconnecting facility 1 has a plurality of sets of the switch 12 and the converter 14 connected in series. In addition, the controller 32 sequentially controls each set of the switch 12 and the converter 14 by a control, that is one unit, of outputting a command to close the switch 12 and outputting a command to switch the converter 14 connected in series to the switch closed by said command. For example, after causing the first switch 12 to be closed, the converter 14 connected in series with this switch 12 is caused to execute the switching. Next, the second switch 12 is caused to be closed, so that the control is executed in sequence for each set.

By such a control by the controller 32 as described above, the switches 12 can be closed in sequence while suppressing the harmonic voltage that is generated in the system interconnecting facility 1 to be always low. That is, for example, when there are 100 switches 12 and 100 converters 14, and if the 100 converters 14 are caused to execute the switching after the 100 switches 12 are simultaneously closed, the 100 converters 14 are consequently activated, but by closing and switching the switch 12 and the converter 14 set by set, the harmonic voltage can be suppressed to be always low. Such a behavior may occur because the circuit situation within the system interconnecting facility 1 differs when the converter is caused to execute the switching one by one, and when all the converters are simultaneously caused to execute the switching.

It is preferable that such a control of closing and switching each set is executed before the number of closed switches becomes within the closed switch number range where the harmonic voltage increases. Moreover, such a control may be given to all sets of the switches 12 and the converters 14, or may be given to at least one set, and because the suppressing effect of the harmonic voltage is achievable when at least one set is controlled. The control may be given after the maintenance of the converter 14 is completed, and said converter 14 is activated.

5. Fifth Embodiment

A fifth embodiment will be described with reference to FIG. 7. The fifth embodiment employs the same basic structure as that of the first embodiment. Only the difference from the first embodiment will be described below, the same reference numeral will be given to the same component as that of the first embodiment, and the detailed description thereof will be omitted.

The converter 14 may have a dead band in which the charging and discharging command is not output when the said command received from outside is low, depending on the type of the converter. The fifth embodiment relates to the control for the controller 32 when the converter 14 has such a dead band.

Figure 7:
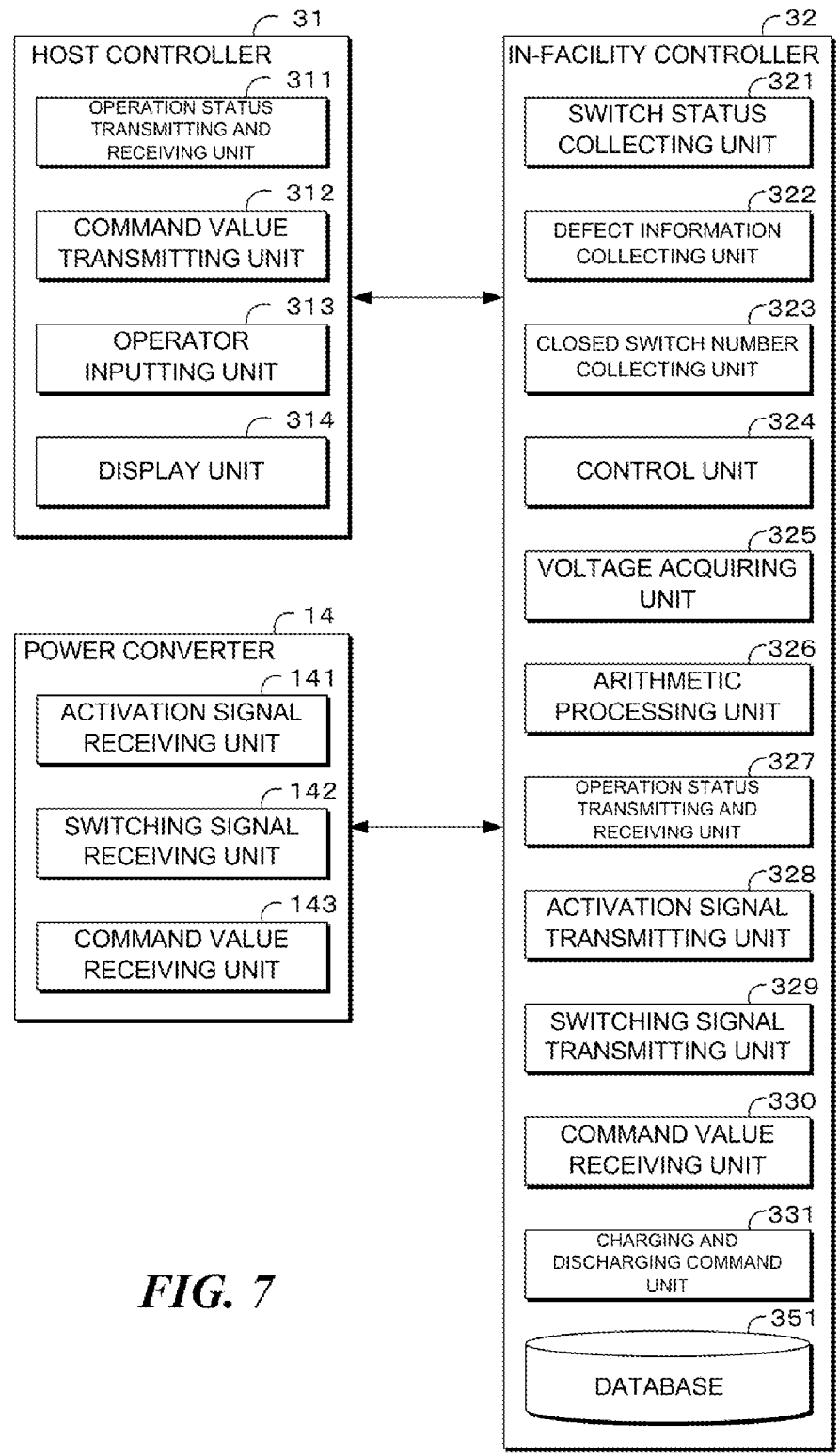
FIG. 7 is a functional block diagram for a controller and for a power converter according to a fifth embodiment.

FIG. 7 is a functional block diagram for the controller 3 and for the converter 14 according to the fifth embodiment. As illustrated in FIG. 7, the controller 32 includes a database 351 for the dead band of the converter 14. The database 351 stores the upper limit of the dead band and the lower limit thereof. Based on the database 351, the controller 32 causes the charging and discharging command unit 331 to create the charging and discharging command value so that the total output by the converters 14 becomes close to zero, and said command value is output to the converters 14. It is preferable that the controller 32 outputs the charging and discharging command value that causes the total output to be zero.

The control for the converter 14 by the controller 32 will be described more specifically. When, for example, the upper limit of the dead band of the converter 14 is +10 kW and the lower limit is −10 kW when the discharging direction from the battery system 2 to the power system is positive, the charging and discharging command unit 331 creates the charging and discharging command value that is the upper limit or the lower limit to cause the total output by the converters 14 to be zero. When, for example, there are the 100 converters 14, the command value for the 50 converters is +10 kW, and the command value for the remaining 50 converters is −10 kW. The distribution of the positive and negative signs of the command value to the converters 14 are arbitrary, and can be designed and modified as appropriate.

By the above controller 32, an adverse effect to the power system is prevented, and an achievement of the harmonic voltage suppressing effect is facilitated. More specifically, when 100 converters 14 are installed within the system interconnecting facility 1, power of 1000 kW reverse flows to the power system if all converters output 10 kW, possibly giving an adverse effect to the power system. Moreover, even when there is no adverse effect to the power system, and if the total output by the converters 14 becomes apart from zero, the harmonic voltage suppressing effect may be disturbed. Hence, by outputting the command value that causes the total output by the converters 14 to become close to zero, achievement of the harmonic voltage suppressing effect is facilitated. Said control may be given when it is determined that the number of closed switches 12 is within the avoided number range.

Moreover, the harmonic voltage can be suppressed without requiring particular structures for the converter 14 even if the converter 14 has a dead band.

6. Sixth Embodiment

A sixth embodiment will be described with reference to FIG. 8. The sixth embodiment employs the same basic structure as that of the fifth embodiment. Only the difference from the fifth embodiment will described, the same reference numeral will be given to the same component as that of the fifth embodiment, and the detailed description thereof will be omitted.

Figure 8:
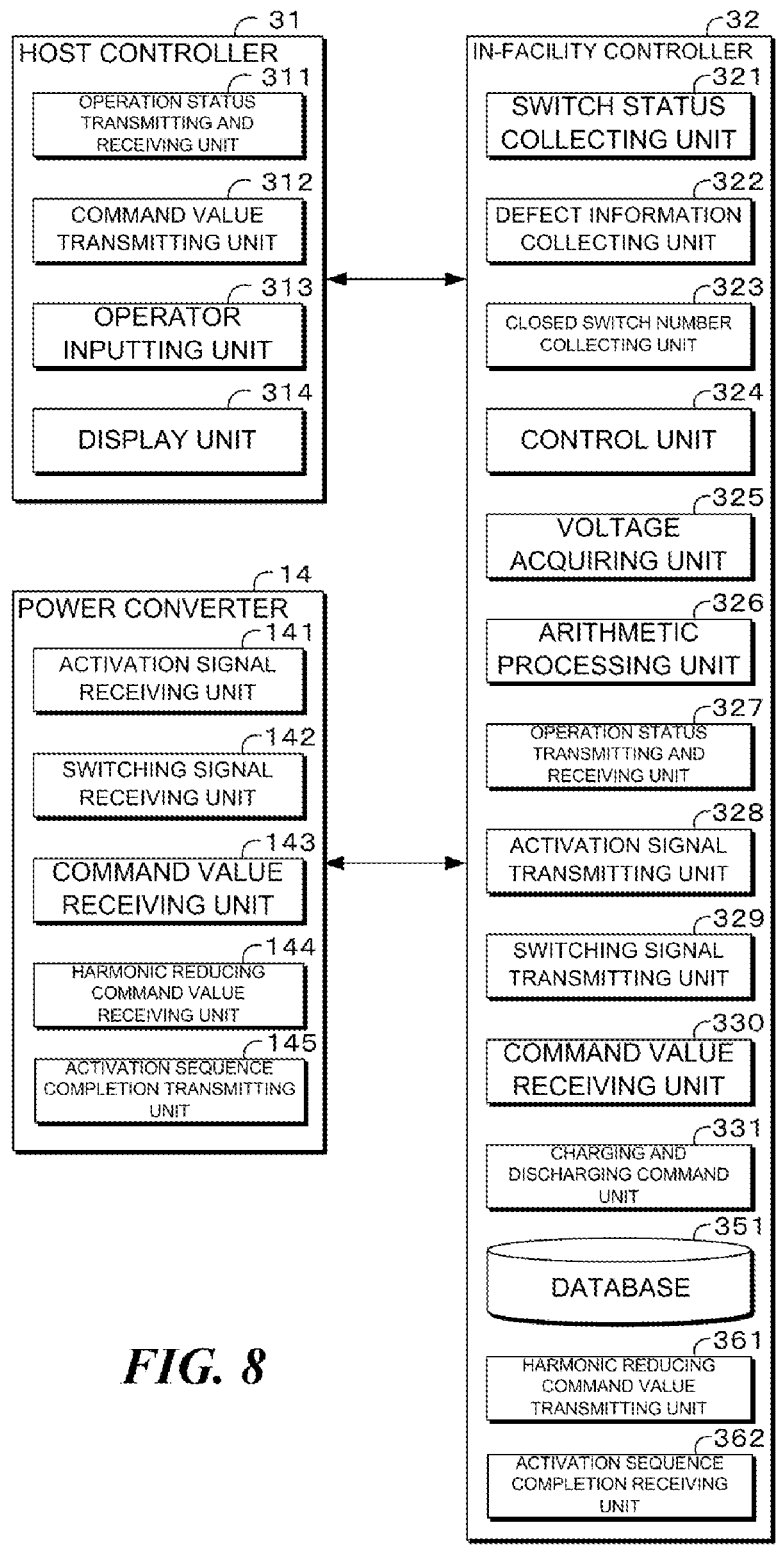
FIG. 8 is a functional block diagram for a controller and a power converter according to a sixth embodiment.

FIG. 8 is a functional block diagram for the controller 3 and for the converter 14 according to the sixth embodiment. The controller 32 includes a harmonic reducing command value transmitting unit 361 and an activation sequence completion receiving unit 362, and the converter 14 includes a harmonic reducing command value receiving unit 144 and an activation sequence completion transmitting unit 145.

The harmonic reducing command value transmitting unit 361 transmits a harmonic reducing command value that causes the output power to be zero to the converter 14 together with the activation signal regardless of the presence and absence of the dead band. The activation sequence completion receiving unit 362 receives a signal of the completion of the activation sequence from the converter 14.

The harmonic reducing command value receiving unit 144 receives the harmonic reducing command value from the harmonic reducing command value transmitting unit 361. The activation sequence completion transmitting unit 145 transmits, to the activation sequence completion receiving unit 362, a signal of the completion of activation and switching upon receiving the activation signal from the activation signal transmitting unit 328 and the harmonic reducing command value from the harmonic reducing command value transmitting unit 361.

By employing the above structure, the total output by the converters 14 can be zero even if the converter 14 has the dead band, and the activation sequence of the converter 14 can be completed with the harmonic voltage being reduced even if there are a communication delay between the converters 14 and a transmission delay of the activation signal and the harmonic reducing command value within the same converter 14.

Moreover, when the controller 32 receives the activation sequence completion signal from the converter 14 and the operation that causes the output power to be zero becomes unnecessary, it is desirable to recover a dead band function. This is because the loss by the converter 14 can be reduced. That is, when receiving the activation sequence completion signal from the converter 14, the controller 32 changes the transmission originator of the command value from the harmonic reducing command value transmitting unit 361 to the charging and discharging command unit 331. Accordingly, since the converter can output at least by the upper limit of the dead band or the lower limit thereof, the loss can be reduced in comparison with a case in which the converter is caused to stop outputting.

7. Other Embodiments

Although several embodiments according to the present disclosure have been described in this specification, such embodiments are merely presented as examples, and are not intended to limit the scope of the present disclosure. The above embodiments can be carried out in other various forms, and various omissions, replacements, and modifications can be made thereto without departing from the scope of the present disclosure. Such embodiments and modified forms thereof are within the scope of the present disclosure, and also within the scope of the invention as recited in appended claims and the equivalent range thereto.

(1) In the first to sixth embodiments, although the operator inputting unit 312 and the display unit 314 are provided at the host controller 31, those components may provided at the in-facility controller 32.

(2) In the first to sixth embodiments, although the harmonic voltage containing rate has been described with reference to the septenary harmonic voltage, the present disclosure is not limited to this example case, and the control that causes the number of closed switches 12 to be out of the avoided number range may be executed based on the characteristics of the tertiary, quinary, nonary, undenary, and tredenary harmonic voltage containing rate. Since the probability to be contained in the system interconnecting facility 1 is high in the quinary and the septenary, and is middle in the undenary and the tredenary, in the second embodiment, when the avoided number range is changed with the fluctuation in harmonic voltage containing rate being a trigger, the fluctuation in the quinary or septenary harmonic voltage containing rate may be preferentially checked. When there is no these fluctuations, the avoided number range may be changed when there is a fluctuation in the nonary or tredenary harmonic voltage containing rate.

REFERENCE SIGNS LIST

1 System interconnecting facility
11, 11a to 11c Transformer
12 Switch
13 Filter
14 Power converter
141 Activation signal receiving unit
142 Switching signal receiving unit
143 Command value receiving unit
144 Harmonic reducing command value receiving unit
145 Activation sequence completion transmitting unit
15 Load
16a to 16c Voltage sensor
2 Battery system
21 Battery
3 Controller
31 Host controller
311 Operation status transmitting and receiving unit
312 Command value transmitting unit
313 Operator inputting unit
314 Display unit
32 In-facility controller
321 Switch status collecting unit
322 Defect information collecting unit
323 Closed switch number collecting unit
324 Control unit
325 Voltage acquiring unit
326 Arithmetic processing unit
327 Operation status transmitting and receiving unit
328 Activation signal transmitting unit
329 Switching signal transmitting unit
330 Command value receiving unit
331 Charging and discharging command unit
341 Load power command unit
351 Database
361 Harmonic reducing command value transmitting unit
362 Activation sequence completion receiving unit

The invention claimed is:

1. A system interconnecting facility connected to a power system, the system interconnecting facility comprising:
   a plurality of power converters connected to the power system;
   a plurality of transformers provided between the power system and the power converters;
   a plurality of switches provided between the transformers and the power converters; and
   a controller that controls opening and closing of the switches,
   wherein the controller outputs, to the switches, respective open and close commands so that a number of closed switches is out of a closed switch number range that is the range within which a harmonic voltage of the system interconnecting facility increases, based on a harmonic voltage containing rate characteristic that is a relationship between the number of closed switches and a harmonic voltage containing rate of the system interconnecting facility.

2. The system interconnecting facility according to claim 1, wherein the controller outputs, to the switches, the open and close commands that achieve the number of closed switches which causes the harmonic voltage containing rate to be equal to or smaller than a predetermined threshold.

3. The system interconnecting facility according to claim 2, wherein the controller comprises:
   a switch status collecting unit that collects open and close status information of each of the switches;
   a closed switch number collecting unit that collects the number of closed switches from the open and close status information;
   a voltage acquiring unit that acquires a measured voltage from a voltage sensor which measures a voltage containing a fundamental wave voltage and an odd-order harmonic voltage; and
   an arithmetic processing unit that calculates the harmonic voltage containing rate from the acquired fundamental wave voltage and odd-order harmonic voltage, and acquires the harmonic voltage containing rate characteristic from the number of closed switches and the calculated harmonic voltage containing rate.

4. The system interconnecting facility according to claim 3, wherein:
   the arithmetic processing unit acquires the harmonic voltage containing rate characteristic when the harmonic voltage containing rate decreases; and
   the controller changes the closed switch number range based on the harmonic voltage containing rate characteristic acquired when the harmonic voltage containing rate decreases.

5. The system interconnecting facility according to claim 1, wherein the controller comprises a load power command unit that outputs, to a load within the system interconnecting facility, a command to consume power.

6. The system interconnecting facility according to claim 1, comprising a plurality of sets of the switches and the power converters, each of the sets containing a switch and a converter connected in series,
   wherein, the controller sequentially executes a control action for each of the sets, the control action including outputting a command to close the switch and outputting a command to switch the converter connected in series to the closed switch.

7. The system interconnecting facility according to claim 1, wherein the controller comprises a database for a dead band of each of the power converters, and
   the controller outputs, to a power converter, a charging and discharging command value that causes a total output of the power converters to become close to zero based on the dead band.

8. The system interconnecting facility according to claim 7, wherein:
   the power converter comprises a receiving unit that receives a harmonic reducing command value to cause output power to be zero regardless of the dead band; and the controller comprises a transmitting unit that transmits, together with an activation signal to the power converter, the harmonic decreasing command value.

* * * * *